US011135696B1

(12) United States Patent
Yenawine

(10) Patent No.: US 11,135,696 B1
(45) Date of Patent: Oct. 5, 2021

(54) GLASS OBJECT AND METHOD FOR FORMING A DEPRESSION IN A GLASS OBJECT FOR CONTAINING CREMATED ASHES

(71) Applicant: Peter Wayne Yenawine, Bethlehem, PA (US)

(72) Inventor: Peter Wayne Yenawine, Bethlehem, PA (US)

( * ) Notice: Subject to any disclaimer, the term of this patent is extended or adjusted under 35 U.S.C. 154(b) by 0 days.

(21) Appl. No.: 16/816,036

(22) Filed: Mar. 11, 2020

(51) Int. Cl.
*B24B 7/24* (2006.01)
*B23C 5/10* (2006.01)
*A61G 17/08* (2006.01)
*A61G 17/007* (2006.01)

(52) U.S. Cl.
CPC .......... *B24B 7/241* (2013.01); *A61G 17/0166* (2017.05); *A61G 17/08* (2013.01); *B23C 5/1009* (2013.01)

(58) Field of Classification Search
CPC .... B24B 7/241; A61G 17/0166; A61G 17/08; B23C 5/1009; E04H 13/008; C03B 23/0013
USPC ........... 27/1; 451/41; 407/54; 65/102; 428/3, 428/542.4
See application file for complete search history.

(56) References Cited

U.S. PATENT DOCUMENTS

| 4,648,162 | A  | * | 3/1987  | Daino ..................... B44C 5/08 27/1 |
| 5,987,720 | A  | * | 11/1999 | Yamamoto ......... A61G 17/0136 27/35 |
| 7,228,602 | B2 | * | 6/2007  | Weisbrot ................ A61G 17/08 27/1 |
| 7,308,741 | B1 |   | 12/2007 | Rydberg et al. |
| 8,336,174 | B1 |   | 12/2012 | Johnson |
| 8,707,526 | B2 |   | 2/2014  | Cooke et al. |
| 9,801,433 | B2 | * | 10/2017 | Murphy ................ B29C 70/745 |
| 10,517,360 | B1 | * | 12/2019 | Bethany ................ A61G 17/08 |
| 2002/0025392 | A1 | * | 2/2002 | Yardley .............. A61G 17/0166 428/3 |
| 2003/0154581 | A1 | * | 8/2003 | Jain ....................... B29C 39/003 27/1 |
| 2005/0071964 | A1 | * | 4/2005 | Vogel ..................... B09B 3/005 27/1 |
| 2006/0261512 | A1 | * | 11/2006 | Weisbrot ................ A61G 17/08 264/234 |
| 2009/0044580 | A1 | * | 2/2009 | Van Ramshorst ...... E04H 13/00 71/15 |
| 2009/0077779 | A1 | * | 3/2009 | Zimmerman ......... E04H 13/008 27/1 |
| 2009/0266108 | A1 | * | 10/2009 | Balme .................. A61G 17/007 63/1.11 |

(Continued)

*Primary Examiner* — William L Miller
(74) *Attorney, Agent, or Firm* — Kattina V. Barsik, Esq.

(57) ABSTRACT

A method for forming a depression into a glass object for storing cremated remains may include coating a metal sphere with diamond dust. The method may include spinning the diamond dust coated metal sphere via a spindle and motor arrangement. The method further may include pressing the spinning diamond dust coated metal sphere against at least one face of the glass object. Furthermore, the method may include applying coolant while pressing the spinning diamond dust coated metal sphere against at least one face of the glass object. The continuous spin and pressure of the diamond dust coated metal sphere against at least one face of the glass object grinds the depression into the glass object.

18 Claims, 5 Drawing Sheets

(56) References Cited

U.S. PATENT DOCUMENTS

| | | | | |
|---|---|---|---|---|
| 2010/0199476 A1* | 8/2010 | Cummings | ............ | A61G 17/08 27/1 |
| 2012/0317765 A1* | 12/2012 | Johnson | ............. | A61G 17/0136 27/1 |
| 2013/0117977 A1* | 5/2013 | Kennedy | ............. | C03C 17/3411 27/1 |
| 2015/0013382 A1* | 1/2015 | Murphy | ............. | B29C 37/0028 63/15 |
| 2015/0209211 A1* | 7/2015 | Savage | ................. | A61G 17/08 27/1 |
| 2016/0271660 A1* | 9/2016 | Camps | ..................... | B44C 5/00 |
| 2019/0328601 A1* | 10/2019 | Stokman | ................... | C03B 7/22 |

\* cited by examiner

GLASS OBJECT AND METHOD FOR FORMING A DEPRESSION IN A GLASS OBJECT FOR CONTAINING CREMATED ASHES

FIELD OF THE DISCLOSURE

The present disclosure relates to a method for forming decorative or memorial articles, and, more particularly, to a method for forming a depression into a glass object for containing cremated ashes.

BACKGROUND OF THE DISCLOSURE

Urns have been conventionally used to contain the cremated remains, such as ashes, to be presented as personal gifts to their loved ones. However, with changing times, articles, like glass objects, have become quite popular. For creating such memorial articles of glass with ashes, conventionally the glass was heated to temperatures reaching well over 2000 degrees, melting it into a molten glass state. When glass is molten, as it cools it is plastic-like and shape-able. Thereafter, once the glass is in a molten state, the ashes of your loved one are scattered on a metal surface without any control and picked up by the molten glass and adheres to it. Because the molten glass is hotter than the ashes, carbon is burned off, which then in turn turns the ashes into a brilliantly white color within the glass.

This conventional method may be cumbersome and may require a large amount of time and precautions to carefully mold the molten glass and then cooling them for about 12 to 48 hours.

Further, there may be other methods, such as creating a depression in solid glass as against the molten ones. But for such solid glass objects to contain cremated ashes, the glass objects need to have a formed depression for containing cremated remains. Forming a depression in such an article, such as, in the glass object requires a skill set. By forming a depression into the glass object, a person intends to make a crematory gift containing ashes of their loved ones or pets. To form the depression in the glass object one needs to be very careful with precision and symmetry. And that is why the method of forming a depression in the glass object matters a great deal.

Conventional methods are either pressed or molded in a hot state. A mold or pressing tool must be designed and made of metal which is time consuming and expensive. These conventional methods for forming a depression in the glass object generally give a non-smooth finish and a non-symmetrical depression. Both methods require that the glass must be heated to a molten temperature and then after its pressed or molded It must be annealed to bring it to room temperature, resulting in a non-optically clear depression. No crematory would have the facilities or the skill to provide these memorial gills. As a result, a glass object with the formed depression go mutinied, resulting in wastage of the glass objects. Further, the conventional method for forming depression in the glass object takes a long duration of time to furnish the end product. As a result, the production of the product in bulk takes too much time.

Accordingly, there exists a need to overcome the shortcomings of the conventional methods for forming a depression in a glass object for storing cremated remains. Further there is a need for a glass object that can contain the cremated remains of a loved one that ranges in size from a miniature piece, of the same design, to a large sculptural object. The miniature piece could be attached to a bail to be worn as a pendant or to be hung as a suncatcher. There exists a need of such a method for forming one or more depressions in n glass object which may facilitate a smooth and symmetrical formation of a depression in the glass object for storing cremated remains. Further, there may be a need for a method for forming a depression in a glass object which may take a short time to form the depression in the glass object for storing cremated remains, such as ashes.

SUMMARY OF THE DISCLOSURE

In view of the foregoing disadvantages inherent in the prior art, the general purpose of the present disclosure is to provide a method for forming depression in a glass object for storing cremated remains, such as ashes, to include all advantages of the prior art, and to overcome the drawbacks inherent in the prior art.

An object of the present disclosure is to provide a method for forming a depression in the glass object which may facilitate smooth and symmetrical formation of the depression in the glass object for storing cremated remains.

Another object of the present disclosure is to develop such a method for forming a depression in a glass object which may take a short time to form the depression in the glass object.

In light of the above objects, in one aspect, a method for forming a depression in a glass object may be provided for storing cremated remains. In one embodiment, the method for forming a depression into a glass object may include coating a metal sphere with diamond dust. The depression may comprise a texture. The method may include spinning the diamond dust coated metal sphere via a spindle and motor arrangement. The method further may include pressing the spinning diamond dust coated metal sphere against at least one face of the glass object. Furthermore, the method may include applying coolant while pressing the spinning diamond dust coated metal sphere against at least one face of the glass object. The continuous spin and pressure of the diamond dust coated metal sphere against at least one face of the glass object grinds the depression into the glass object.

In one embodiment, the diamond dust having a predetermined coarseness.

In one embodiment, the depression on the glass object may be of a half dome structure.

In one embodiment, coating the metal sphere with diamond dust may include electroplating the metal sphere by the diamond dust of the predetermined coarseness.

In one embodiment, the predetermined coarseness of the diamond dust may be obtained from a rough cut or smooth cut of a diamond piece.

In one embodiment, spinning the diamond dust coated metal sphere via the spindle and motor arrangement in a horizontal direction.

In one embodiment, continuous spin and pressure of the diamond dust coated metal sphere against at least one face of the glass object grinds the depression into the glass object and forms a depression of a predetermined depth.

In one embodiment, the method further includes washing away grounds of the glass object generated during formation of the depression by the application of coolant.

In one embodiment, the method, further includes polishing the depression of the glass object.

In one embodiment, the method, further includes drying the depression of the glass object.

In another aspect, the method for forming a glass object having a depression may be provided for storing cremated remains. The method includes coating a metal sphere with diamond dust. The method spinning the diamond dust coated metal sphere via a spindle and motor arrangement. The method pressing the spinning diamond dust coated metal sphere against at least one face of the glass object. The continuous spin and pressure of the diamond dust coated metal sphere against at least one face of the glass object grinds the depression into the glass object. Such depression may include a texture. Further, the method may include adding adhesive in the depression. Furthermore, the method may include filling the depression having the adhesive with ashes, and thereafter curing the adhesive with the ashes in the depression.

In one embodiment, the diamond dust may have a predetermined coarseness.

In one embodiment, the depression on the glass object may be of a half dome structure.

In one embodiment, coating the metal sphere with diamond dust may include electroplating the metal sphere by the diamond dust of the predetermined coarseness.

In one embodiment, the predetermined coarseness of the diamond dust may be obtained from rough cut or smooth cut of a diamond piece.

In one embodiment, the method spinning the diamond dust coated metal sphere via a spindle and motor arrangement may include spinning in a horizontal direction.

In one embodiment, the continuous spin and pressure of the diamond dust coated metal sphere against at least one face of the glass object grinds the depression into the glass object and forms a depression of predetermined depth.

In one embodiment, the method applying coolant while pressing the spinning diamond dust coated metal sphere against at least one face of the glass object.

In one embodiment, the method, further may include washing away grounds of the glass object generated during formation of the depression by the application of coolant.

In one embodiment, the method, further includes polishing the depression of the glass object.

In one embodiment, the method, further includes drying the depression of the glass object.

In one embodiment, the glass object which contains the cremated remains of a loved one ranges in size from a miniature piece, of the same design, to a large sculptural object. The miniature piece could be attached to a bail to be worn as a pendant or to be hung as a suncatcher.

In another aspect, a glass object for storing cremated remains may be provided. The glass object may include a depression. Such depression may include a texture. The depression may be configured to be formed by coating a metal sphere with diamond dust. The depression may be configured to be formed by spinning the diamond dust coated metal sphere via a spindle and motor arrangement. Further, pressing the spinning diamond dust coated metal sphere against at least one face of the glass object. The continuous spin and pressure of the diamond dust coated metal sphere against at least one face of the glass object grinds the depression into the glass object.

Further, the method may include adding adhesive in the depression. Furthermore, the method may include filling the depression with ashes and curing the ashes in the depression.

In one embodiment, the diamond dust having a predetermined coarseness.

This together with the other aspects of the present disclosure, along with the various features of novelty that characterize the present disclosure, is pointed out with particularity in the claims annexed hereto and forms a part of the present disclosure. For a better understanding of the present disclosure, its operating advantages, and the specified object attained by its uses, reference should be made to the accompanying drawings and descriptive matter in which there are illustrated exemplary embodiments of the present disclosure.

BRIEF DESCRIPTION OF THE DRAWINGS

The advantages and features of the present disclosure will become better understood with reference to the following detailed description taken in conjunction with the accompanying drawing, in which:

FIG. 15 shows a flow diagram showing the operational method to form a depression over a glass object. In accordance with an exemplary embodiment of the present disclosure.

Like reference numerals refer to like parts throughout the description of several views of the drawing.

DETAILED DESCRIPTION OF THE DISCLOSURE

The exemplary embodiments described herein detail for illustrative purposes are subject to many variations in implementation. The present disclosure provides a method for forming depression in the glass object. It should be emphasized, however, that the present disclosure is not limited to the method for forming depression in the glass object. It is understood that various omissions and substitutions of equivalents are contemplated as circumstances may suggest or render expedient, but these are intended to cover the application or implementation without departing from the spirit or scope of the present disclosure.

The terms "a" and "an" herein do not denote a limitation of quantity, but rather denote the presence of at least one of the referenced items.

The terms "having", "comprising", "including", and variations thereof signify the presence of a component.

A method for forming a depression in a glass object for storing cremated remains will now be explained in conjunction with FIGS. 1-6 below, in accordance with various exemplary embodiments of the present disclosure. Without departing from the scope of the present disclosure, the drawings as shown herein are only for better understanding of the disclosure and may not be in anyway considered to be limiting only to the diagrams as disclosed herein. There may be various other arrangements that may be covered by the claims of the present disclosure.

Figure 1A:
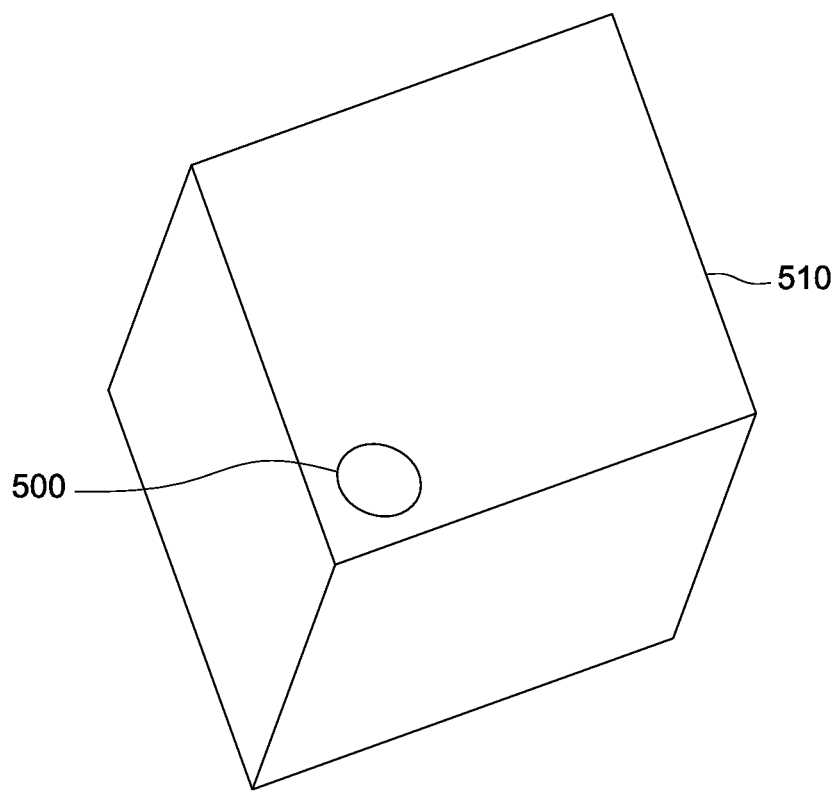
FIG. 1A illustrates a glass object having a depression for storing cremated remains is illustrated, in accordance with an exemplary embodiment of the present disclosure.
Figure 4A:
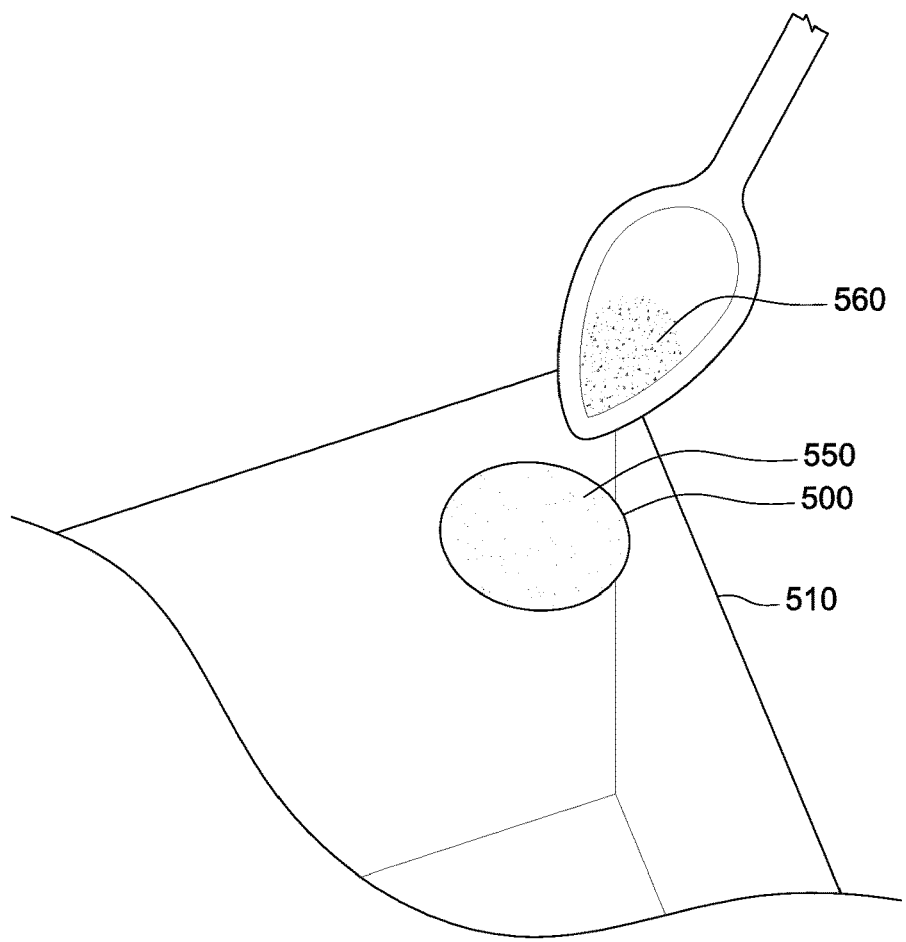
FIGS. 4A and 4B, respectively, illustrate a diagram in which filling of ashes in a depression formed in a glass object is shown, and a depression formed in a glass object cured with ashes is shown, in accordance with an exemplary embodiment of the present disclosure.
Figure 4B:
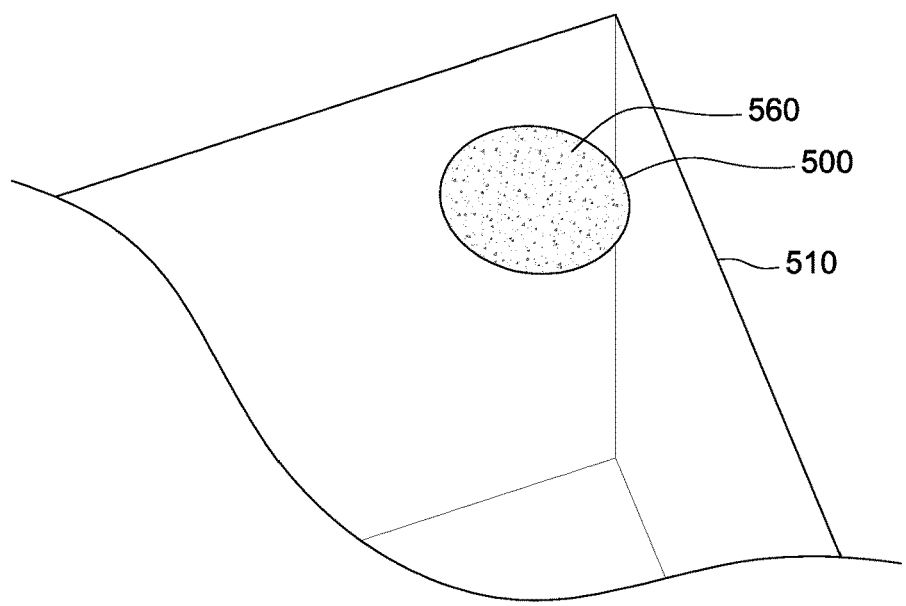
Figure 5:
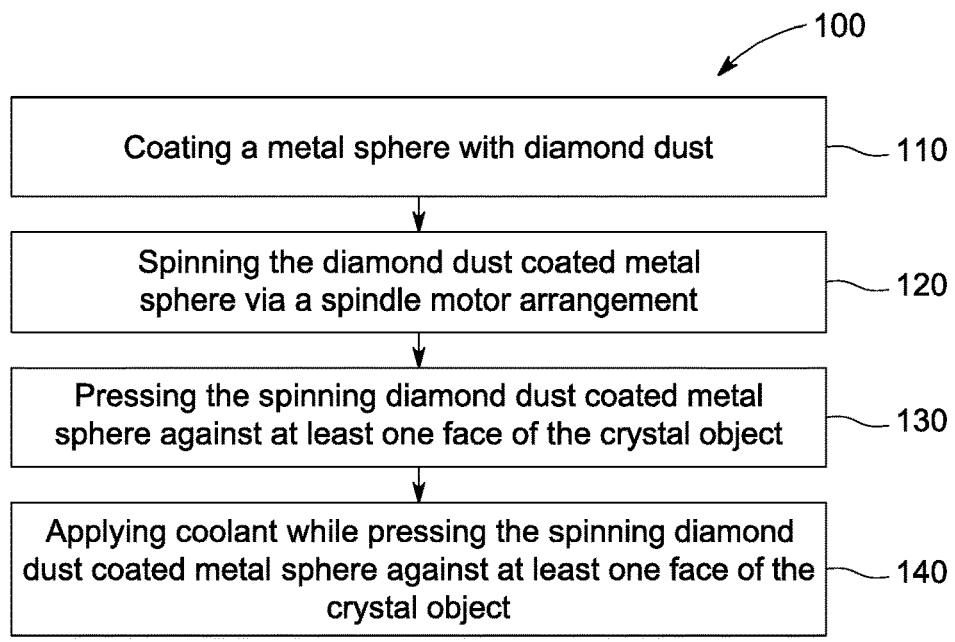

Referring now to FIG. 1A, a glass object 510 for storing cremated remains is illustrated. The glass object 510 includes a depression 500 that may store cremated remains, such as ashes therein, and will be explained herein below in detail. The depression 500 may be formed on the glass object 510 by a method 100 as illustrated in FIG. 5 and will be described in conjunction with FIGS. 1 to 5. Further. The glass object 510 may include adhesive 550 and ashes 560, such as cremated remains, in the depression 500 of the glass object 510; and will be described with reference to FIG. 6 in conjunction with FIG. 5.

Figure 1B:
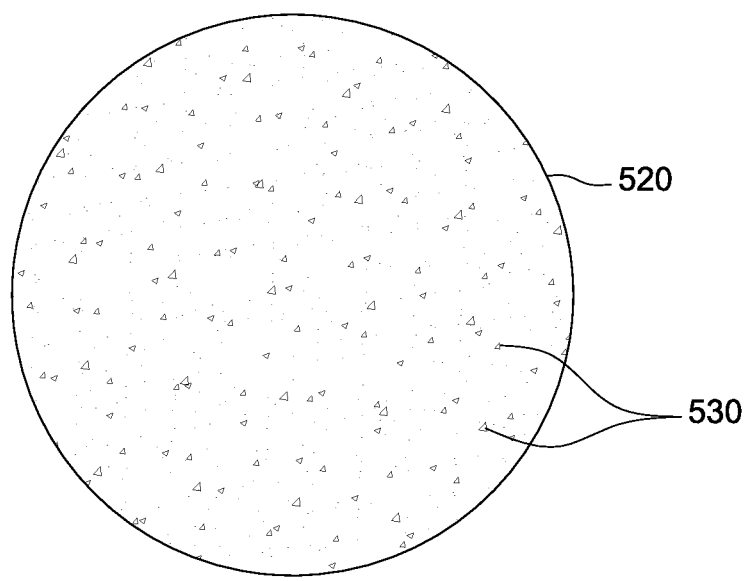
FIG. 1B illustrates a diagram of a metal sphere electroplated with diamond dust, in accordance with an exemplary embodiment of the present disclosure.

As illustrated in FIG. 5, and described in conjunction with FIG. 1 to 4, the method 100 at 110 provides a metal sphere 520 to be coated with diamond dust 530 to grind the depression 500 into the glass object 510. As seen in FIG. 1B, the diamond dust 530 may have a predetermined coarseness. The diamond dust 530 may be obtained from rough cut or smooth cut of a diamond piece. The coating of diamond dust 530 over the metal sphere 520 may, for example, be done via an electroplating process. However, without departing from the scope of the present disclosure, the coating of diamond dust 530 over the metal sphere 520 may be done via other processes, such as adhesive sticking and so forth. As seen in FIG. 1, the metal sphere 520, as illustrated may be made up of one of a material including, but not limited to, steel, iron, etc.

Figure 2A:
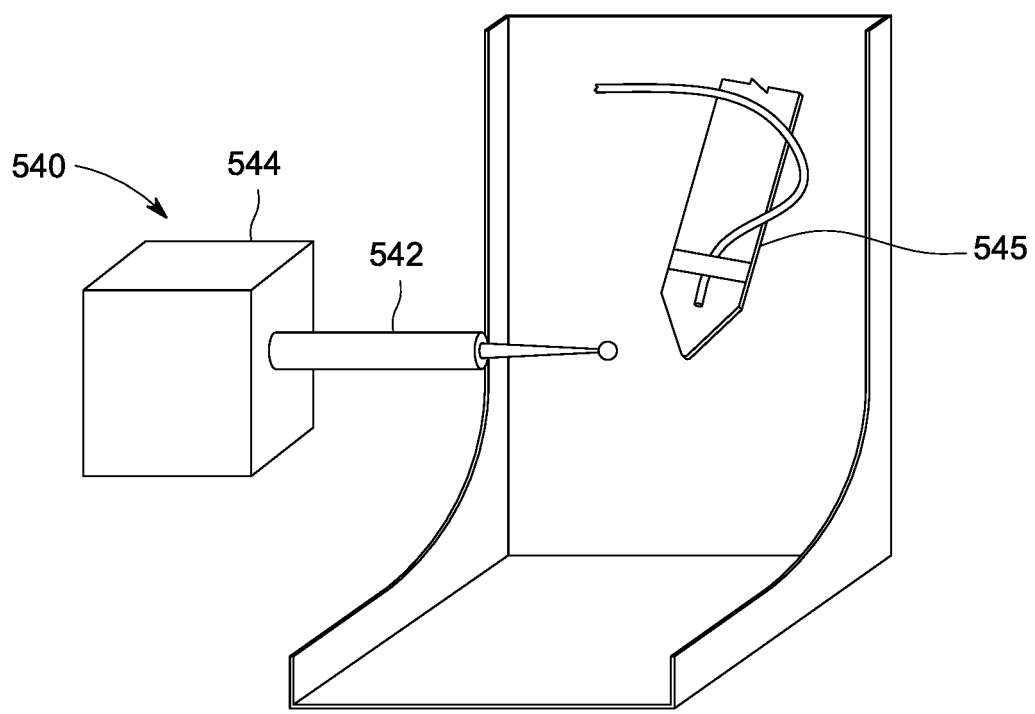
FIGS. 2A and 2B, respectively, illustrate a diagram of a spindle-motor arrangement with coolant supply, and a spindle-motor arrangement with coolant supply and a glass object, in accordance with an exemplary embodiment of the present disclosure.
Figure 2B:
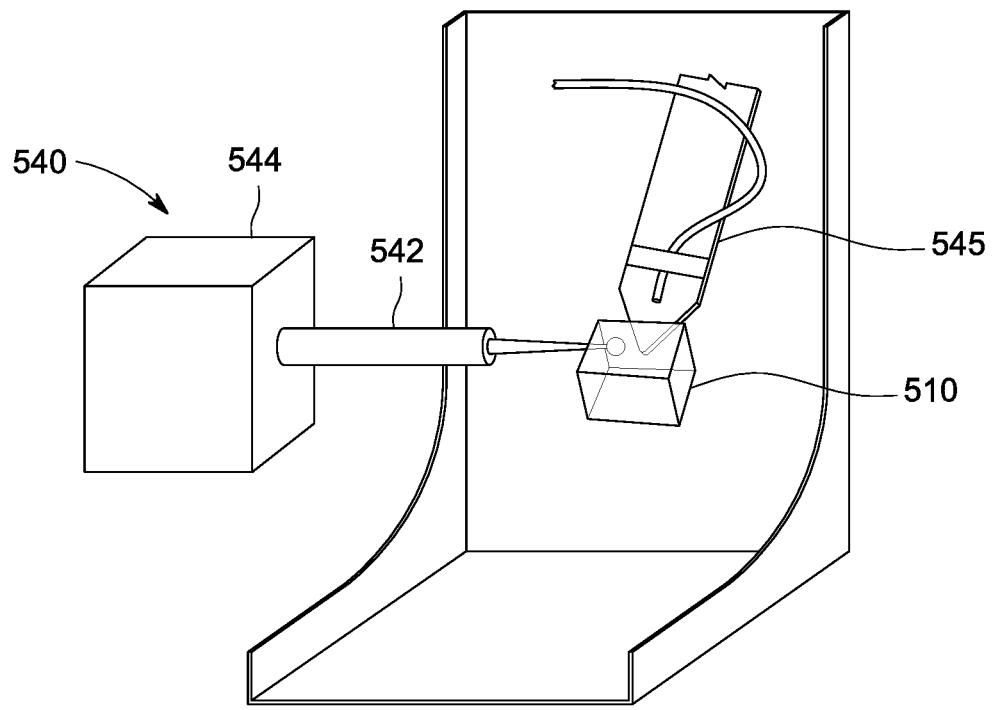

Further, as seen in FIG. 5, the method, for grinding the depression 500 into the glass object 510, at 120, includes spinning of the diamond dust coated metal sphere 520 via a spindle and motor arrangement 540, as seen in FIGS. 2A and 2B and will be described herein.

FIGS. 2A and 2B, as depicted, respectively, illustrates the spindle-motor arrangement 540, and the spindle-motor arrangement 540 with a coolant supply 545 and a glass object 510, in accordance with an exemplary embodiment of the present disclosure. As illustrated in FIG. 2A, a spindle member 542 may be coupled to a motor member 544 from one end and the other end of the spindle member 542 may be coupled to the metal sphere 520. The coolant supply 545 may be fixed perpendicular to the spindle-motor arrangement 540 in an upward direction. However, without departing from the scope of the present invention, the coolant supply 545 may be fixed in any other position with respect to the spindle-motor arrangement 540. The coolant supply 545 may supply the coolant upon requirement. The spindle-motor arrangement 540 and the spindle-motor arrangement 540 as described herein are only for the purpose of understanding the embodiments of the present disclosure, and shall not in any manner be considered to be limited to only such an arrangement as various other arrangements may be provided to spin the diamond dust coated metal sphere 520.

As illustrated in FIG. 2A, the glass object 510 may be brought close to the spindle-motor arrangement 540 with the coolant supply 545. The diamond dust coated metal sphere 520 may be capable of spinning due to coupling with the spindle-motor arrangement 540. The spinning of the diamond dust coated metal sphere 520 may spin in a horizontal direction.

Further, as seen in FIG. 5, the method 100, at 130, includes pressing the spinning diamond dust coated metal sphere 520 against at least one face of the glass object 510. As seen in FIG. 2B, at least one face of the glass object 510 may be pressed against the spinning diamond dust coated metal sphere 520. Further, the coolant supply 545 may supply the coolant while pressing 300 the spinning diamond dust coated metal sphere 520 against at least one face of the glass object 510. The continuous spin and pressure of the diamond dust coated metal sphere 520 against at least one face of the glass object 510 may grind the depression 500 into the glass object 510 up to a desired depth. The spinning process may create fine grindings of the glass object 510 as a by-product, which may be washed away by suppling the coolant by the coolant supply 545. The depression 500 may be of a suitable depth us per the requirement of the user.

In one example, the depression 500 may be of a half dome structure of 3/16 to 3/4" in diameter (+/− tolerance as required), which may complement the diameter of the metal sphere 520. Further, such depression 500 may comprise a texture, which may complement a texture of the metal sphere 520 coated with the diamond dust 530.

The depression 500 may be capable of holding fine particles of a substance and will be described herein with reference to FIG. 6 while describing the formation of the glass object 510 with the depression 500. As shown in FIGS. 3A and 3B, the depression 500 may be made in the corner of the one face of the glass object 510, however without departing from the scope of the present invention the depression 500 in the glass object 510 may be made at any face and at any location of the glass object 510.

In one embodiment, the method 600 may further include additional steps, such as polishing the depression 500 of the glass object 510; and drying the depression 500 of the glass object 510.

Figure 3:
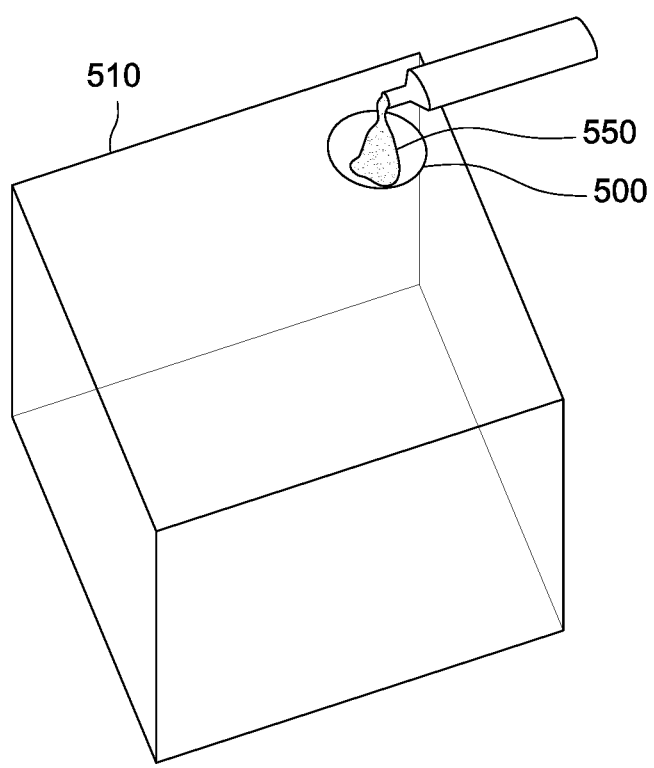
FIG. 3 illustrates a diagram of adding adhesive in a depression formed in a glass object, in accordance with an exemplary embodiment of the present disclosure.
Figure 6:
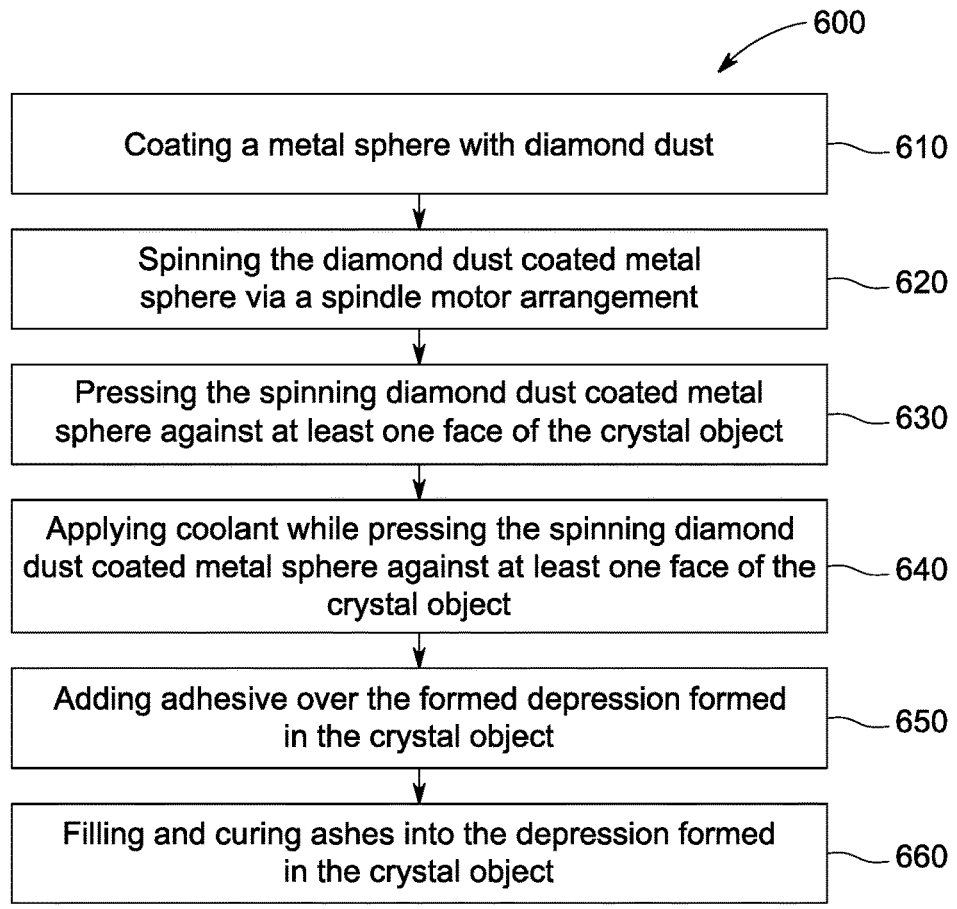
FIG. 6 shows a flow diagram allowing the operational method to form A glass object having a depression, in accordance with an exemplary embodiment of the present disclosure.

Referring now to FIG. 6, a method 600 for forming a glass object, such as the glass object 510, having a depression, such as the depression 500 will be described herein in conjunction with FIGS. 1 to 5. The method 600 includes coating 610 the metal sphere 520 with diamond dust similar to 110; spinning 620 the diamond dust coated metal sphere 520 similar to 120; pressing 630 the spinning diamond dust coated metal sphere 520 against at least one face of the glass object similar to 130, and excluded herein for further explanation for the sake of brevity. The method 600, further, at 640, includes adding an adhesive in the depression. As seen in FIG. 3B, the suitable adhesive 550 may be added to the depression 500. The adhesive 550 may be added all over the depression 500 formed in the glass object 510.

The method 600, further, at 650, includes filling the depression 500 with ashes 560. Furthermore, the method 600, further, at 600, includes curing the adhesive 550 with the ashes 560 in the depression 500. As seen in FIGS. 4A and 4B, a diagram of filling ashes 560 in the depression 500 and curing the ashes 560 in the depression 500 are illustrated. FIG. 4A depicts the depression 500 formed in the glass object 510 capable of holding ashes 560. The ashes 560 may be filled in the depression 500 formed in the glass object 510. Once the ashes 560 are filled, the adhesive 550 may facilitate sticking of the ashes 560 with the surface of the depression 500 formed in the glass object 510. Further, the ashes 560 may be cured in the depression 500, as shown in FIG. 4B. In one example embodiment, curing the adhesive 550 with the ashes 560 comprises exposing in UV light for a predetermined time, such as, for about 8 seconds.

The present disclosure is advantageous in forming a depression in a glass object which may facilitate smooth and symmetrical grinding of a depression into the glass object. Further, the present disclosure is advantageous for forming a depression in a glass object which may take a short duration of time to grind the depression into the glass object. The diamond dust coated metal sphere takes a short time to cut the glass object. This fast cutting of the glass object via the diamond dust coated metal sphere may reduce production time of the end product. As a result, the end product may be produced in bulk in less production time. Such a glass object with a depression may be advantageous to be used for storing cremated ashes of loved ones or pets.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, and to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present disclosure.

What is claimed is:

1. A method of forming a depression into a glass object for storing cremated remains, the method comprising:
    coating a metal sphere with diamond dust, the diamond dust having a predetermined coarseness;
    spinning the diamond dust coated metal sphere via a spindle and motor arrangement;
    pressing the spinning diamond dust coated metal sphere against at least one face of the glass object; and
    wherein continuous spin and pressure of the diamond dust coated metal sphere against the at least one face of the glass object forms the depression on the glass object, wherein the depression comprises a texture for holding the cremated remains.

2. The method of claim 1 further comprising applying coolant while pressing the spinning diamond dust coated metal sphere against the at least one face of the glass object.

3. The method of claim 1, wherein coating the metal sphere with diamond dust comprises:
    electroplating the metal sphere by the diamond dust of the predetermined coarseness.

4. The method of claim 1, wherein the predetermined coarseness of the diamond dust is obtained from rough cut or smooth cut of a diamond piece.

5. The method of claim 1, wherein spinning the diamond dust coated metal sphere via a spindle and motor arrangement comprises:
    spinning in a horizontal direction.

6. The method of claim 1, wherein continuous spin and pressure of the diamond dust coated metal sphere against the at least one face of the glass object forms the depression on the glass object forms the depression of predetermined depth.

7. The method of claim 2, further comprising washing away grounds of the glass object generated during formation of the depression by the application of the coolant.

8. The method of claim 1, further comprising:
    polishing the depression of the glass object.

9. The method of claim 1, further comprising:
    drying the depression of the glass object.

10. A method of forming a glass object having a depression for storing cremated remains, the method comprising:
    coating a metal sphere with diamond dust, the diamond dust having a predetermined coarseness;
    spinning the diamond dust coated metal sphere via a spindle and motor arrangement;
    pressing the spinning diamond dust coated metal sphere against at least one face of the glass object, wherein continuous spin and pressure of the diamond dust coated metal sphere against the at least one face of the glass object forms the depression on the glass object, wherein the depression comprises a texture;
    adding an adhesive in the depression, wherein the texture in the depression holds the adhesive;
    filling the depression with the cremated remains, wherein the texture in the depression holds the cremated remains; and
    curing the adhesive with the cremated remains in the depression.

11. The method of claim 10, wherein coating the metal sphere with diamond dust comprises:
    electroplating the metal sphere by the diamond dust of the predetermined coarseness.

12. The method of claim 10, wherein the predetermined coarseness of the diamond dust is obtained from rough cut or smooth cut of a diamond piece.

13. The method of claim 10, wherein spinning the diamond dust coated metal sphere via a spindle and motor arrangement comprises:
    spinning in a horizontal direction.

14. The method of claim 10, wherein continuous spin and pressure of the diamond dust coated metal sphere against the at least one face of the glass object forms the depression on the glass object forms the depression of predetermined depth.

15. The method of claim 10 further comprising applying coolant while pressing the spinning diamond dust coated metal sphere against the at least one face of the glass object.

16. The method of claim 15, further comprising washing away grounds of the glass object generated during formation of the depression by the application of the coolant.

17. The method of claim 10, further comprising:
    polishing the depression of the glass object; and
    drying the depression of the glass object.

18. The method of claim 10, wherein curing the adhesive with the cremated remains comprises exposing in UV light for a predetermined time the adhesive with the cremated remains.

* * * * *